Feb. 26, 1952 W. A. MILLER 2,587,193
COMPUTING DEVICE
Filed Sept. 30, 1947
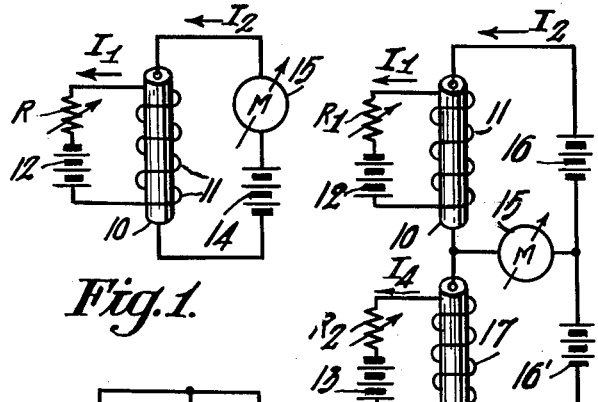
Fig.1.
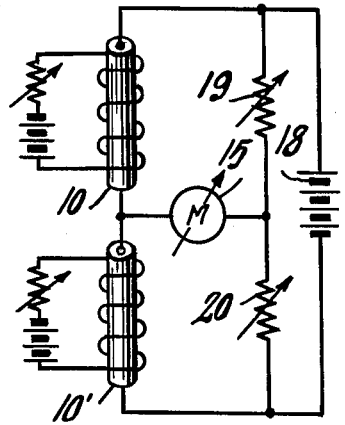
Fig.2.
Fig.3.
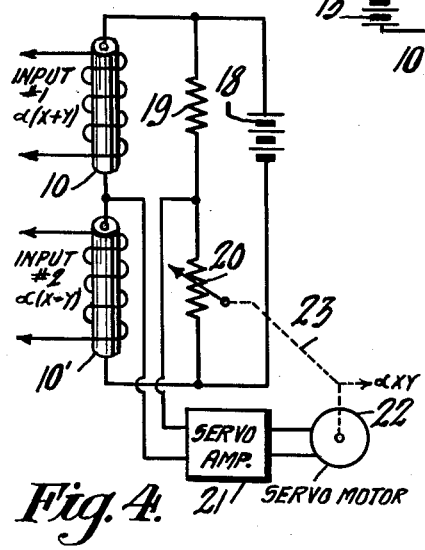
Fig.4.
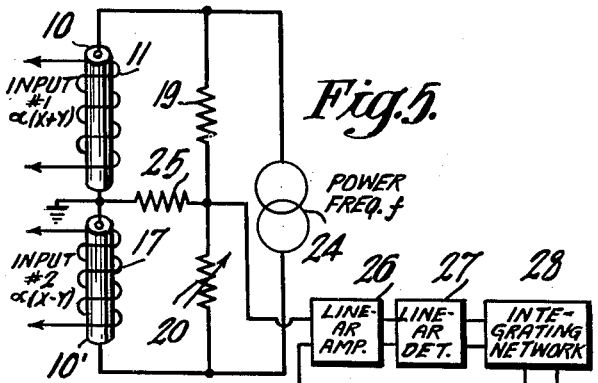
Fig.5.
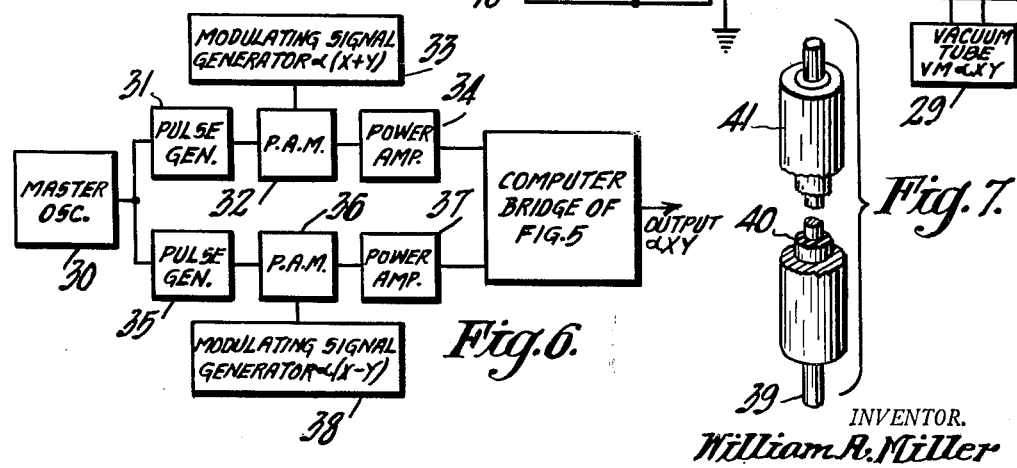
Fig.6.
Fig.7.
INVENTOR.
William A. Miller
BY
C. D. Tuska
ATTORNEY Patented Feb. 26, 1952

2,587,193

UNITED STATES PATENT OFFICE 2,587,193

COMPUTING DEVICE

William A. Miller, Port Jefferson Station, N. Y., assignor to Radio Corporation of America, a corporation of Delaware Application September 30, 1947, Serial No. 777,046

9 Claims. (Cl. 235—61)

This invention relates to computing devices, and more particularly to an improved computing device including semi-conductors which (1) are subjected to magnetic fields proportional in intensity to the values of the factors entering into the computation and (2) provide an output current of a value proportional to the value of the computed result.

It is well known that the presence of a magnetic field varies the electrical conductivity of either a metal or a semi-conductor. More complete information on this point is to be found in "Electronen Theorie der Mettals" by H. Frohlich, pages 222 ff. (metals) and pages 240 ff. (semi-conductors).

Particularly in the case of weak magnetic fields, both metals and semi-conductors have a resistance which is a function of the square of the magnetic field to which they are subjected. Change in the resistance of a metal in response to change in the intensity of the magnetic field in which it is immersed is relatively small. For example, the ratio of the change of the resistance of copper is about ten per cent from zero magnetic field to a field of 100 kilogauss. Such change of resistance is greater in the case of semi-conductors like cuprous oxide with an excess of oxygen, zinc oxide with an excess of zinc, and titanium oxide with an excess of titanium. While bismuth, antimony, and arsenic are usually classified as metals, they behave more like semi-conductors. Also usable are germanium, silicon, and tellurium.

The present invention may utilize any material which has its resistance varied proportionally to the intensity of an applied magnetic field, and has for its principal object the provision of an improved computing device and method of operation whereby magnetic fields proportional in intensity to the values of the factors entering into a computation are converted into an electrical current or potential of a value proportional to the value of the result of the computation. Such current or potential may be utilized to energize a meter which is calibrated to indicate the value of the computed result, may energize a servo-motor or may be applied to other types of load devices to be operated in accordance with the computed result.

The invention will be better understood from the following description considered in connection with the accompanying drawings and its scope is indicated by the appended claims.

Referring to the drawings:

Fig. 1 illustrates a form of the invention whereby variation in the resistance of a magnetic field member is indicated by a meter;

Figs. 2 and 3 show a pair of magnetic field responsive members connected in a bridge circuit, the circuit of Fig. 2 being energized from two sources of potential and the circuit of Fig. 3 being energized from a single source of potential;

Fig. 4 shows the bridge circuit as arranged to drive a servo motor;

Fig. 5 shows the bridge circuit as arranged to deliver its output to a linear amplifier;

Fig. 6 shows the invention as modified to derive the product of two quantities and Fig. 7 illustrates a modified form of the magnetic field responsive member and its excitation coil.

The computer of Fig. 1 includes a semi-conductor or magnetic field responsive member 10 which is located in the magnetic field produced by a coil 11. Current $I_1$ is supplied to the coil 11 from a battery 12 through an adjustable resistor R. Current $I_2$ from a battery 14 flows through the member 10 and is indicated by a meter 15. For any setting of R the current $I_2$ is a linear function of the resistance of the semi-conductor 10 which is a function of the resistance of 10 without a magnetic field and the square of the magnetic field set-up due to $I_1$. That is, the change of current, $\Delta I_2$, is a function of the square of $\Delta I_1$, where $\Delta$ is read "the change of."

If 12 is a source of constant potential and $I_1$ is changed by varying $R(\Delta R)$ we have $$\Delta I_2 \sim \frac{\Delta \rho}{\rho + \Delta \rho}$$

where $\rho$ is the resistance of the semi-conductor and $\Delta \rho$ is the change in its resistance but $$\frac{\Delta \rho}{\rho + \Delta \rho} \sim (\Delta H)^2$$

and $$\Delta I_1 \sim \left(\frac{\Delta R}{R + \Delta R}\right)$$

and $$(\Delta I_1)^2 \sim (\Delta H)^2 \therefore \Delta I_2 \sim \left(\frac{\Delta R}{R + \Delta R}\right)^2$$

In the bridge circuit of Fig. 2, the magnetic field responsive member 10 is arranged as in Fig. 1. In addition, there is provided a second magnetic field responsive member 10' which is connected through the meter 15 to a battery 16 and is located in the magnetic field of a coil 17 supplied with current from a battery 13 through an adjustable resistor R2.

It will be noticed that the identical power supplies 16 and 16' (assuming the members 10 and 10' to be similar) are so poled that the current flowing in the meter M is equal to the difference between I2 and I3, which are the currents flowing through the computer elements, 10 and 10' respectively. As before we now have, $$\Delta I_2 \sim \left(\frac{\Delta R_1}{R_1+\Delta R_1}\right)^2$$

and $$\Delta I_3 \sim \left(\frac{\Delta R_2}{R_2+\Delta R_2}\right)^2$$

Also if the bridge was initially balanced, i. e. if when $I_1=I_4$; $I_2=I_3$, then the deflection, $d$, of the meter M is $$d \sim (\Delta I_2 - \Delta I_3)$$

$$d \sim \left(\frac{\Delta R_1}{R_1+\Delta R_1}\right)^2 - \left(\frac{\Delta R_2}{R_2+\Delta R_2}\right)^2$$

Next let us suppose that $$\left(\frac{\Delta R_1}{R_1+\Delta R_1}\right)$$

is caused by the sum of two factors (which are to be multiplied): $x+y$, and $$\left(\frac{\Delta R_2}{R_2+\Delta R_2}\right)$$

is caused by the difference of the same two factors: $x-y$. Then, $$d \sim (x+y)^2 - (x-y)^2$$

or finally $$d \sim xy$$

which is what is desired.

The modification shown in Fig. 3 is an obvious one. Here only one supply battery (or power source) 18 is needed to energize the computer, and the resistors 19 and 20 are used to balance out the inequalities in members 10 and 10' with zero magnetic field.

Fig. 4 shows the meter 15 replaced by a servo-amplifier 21 driving a servo-motor 22 whose shaft 23 controls the balance of the bridge by varying 20, thus making this instrument a null instrument. The shaft of the servo-motor thus turns an amount which is proportional to the product $xy$, as indicated.

In the modification of Fig. 5, the battery 18 is replaced by a source 24 from which alternating potential of a frequency $f$ is applied to the bridge circuit and the meter 15 is replaced by a resistor 25. Potential developed across the resistor 25 is applied to the input of a linear amplifier 26 which delivers its output through a linear detector 27 and an integrating network 28 to a vacuum tube volt-meter 29 which may be calibrated to indicate the product of the quantities represented by the currents supplied to the coils 11 and 17. The amplifier 26, detector 27, network 28, and volt-meter 29 may be of any of the various well known forms of such devices suitable for the purpose.

At times there is a necessity for rapid calculation (more rapid than an ordinary servo-mechanism can follow) of products. In such a case the bridge of Fig. 5, or a modification is suitable for operation at various energizing frequencies. The linear amplifier receives a signal, due to the unbalance of the bridge, which is proportional to the product $xy$, this signal is rectified in a linear detector, integrated and the potential developed across the storage element of the integrater is measured by a vacuum tube voltmeter whose output is proportional to the product $xy$ if the time constant of the integrator is large compared to the period, $1/f$, of the oscillator used to energize the bridge and small compared to the time allotted to a single calculation.

The modification of Fig. 6 shows the bridge circuit of the preceding figures as having its coils supplied with pulses modulated in amplitude in accordance with the values of the factors to be multiplied. Thus one of the coils is excited by pulses controlled in frequency by a master oscillator 30 and supplied from a generator 31 through a pulse amplitude modulator 32 and a power amplifier 33. A modulating signal generator 33 is connected to the pulse amplitude modulator 32 for modulating the amplitude of the applied pulses in accordance with the value of one of the factors $_a(x+y)$. The pulses applied to the other coil of the bridge are similarly modulated by a pulse generator 35, a pulse amplitude modulator 36, a power amplifier 37 and a modulating signal generator 38.

All of the computer elements have been shown as rods surrounded by coils which are used to produce the magnetic field. This is not necessary, and a possible modification is shown in Fig. 7. The rod 39 is a metallic wire which carries the current which would otherwise be carried in the coils as in Figs. 1–5. 40 is a very thin layer of insulation separating the wire 39 from the semi-conductor 41. This circuit has two advantages over the coil type, namely, its inductance is less than a coil and the magnetic field can change more rapidly than in the former type (Sommerfeld and Bethe, Handbuch der Physik, vol. 24, part 2, p. 571) since the magnetic field is, in this case, transverse to the direction of the current in the semi-conductor, the change in resistance of the semi-conductor being 1.5–3.0 times as great, for a given change of field, as in the other cases where the magnetic field direction is parallel to the current flow in the semi-conductor. It has the disadvantage that either very large currents or very long lengths must be used to obtain sufficient sensitivity.

What the invention provides is an improved computer including a member having a resistance which changes in response to change in a magnetic field in which it is located, means for controlling the intensity of such magnetic field in accordance with the value of factors of the computation, and means operable in response to such change in resistance for producing an effect determined by the result of the computation.

I claim as my invention:

1. In a device for producing a voltage proportional to the value of the product of $x$ times $y$, the combination of a bridge circuit including a pair of elements having a resistance which changes in response to the application of a magnetic field, a means associated with each of said elements for applying a magnetic field thereto, means to excite one of said last-named means and to determine the value of the magnetic field applied to its associated element as dependent upon the value of $(x+y)$, means to excite the other of said magnetic field applying means and to determine the value of the magnetic field applied to its associated element as dependent on the value of $(x-y)$, and means for deriving from said circuit a voltage proportional to the value of the product $x$ times $y$.

2. A device as set forth in claim 2 wherein the last recited means includes a servo motor energized from the output of the bridge circuit and arranged to control the balance of said circuit.

3. A device as set forth in claim 1 wherein the bridge is energized from an A. C. source and the last means recited by claim 1 includes a linear amplifier responsive to the bridge output, a linear detector responsive to the output of said amplifier, and an integrating network responsive to the output of said detector.

4. A device as set forth in claim 1 wherein each of said means for exciting said means for applying the magnetic field to the field responsive elements includes a pulse generator, a modulating signal generator and a pulse amplitude modulator responsive to the outputs of said generators.

5. A device as set forth in claim 1 wherein the magnetic field responsive elements include a conductor, an insulation coating surrounding said conductor, and a semi-conducing material surrounding said coating.

6. A device as set forth in claim 1 wherein the field responsive element is cuprous oxide with an excess of oxygen.

7. In a device for producing a voltage proportional to the value of the product of $x$ times $y$, the combination of a bridge circuit including a pair of elements having a resistance which changes in response to the application of a magnetic field, means for energizing said bridge from an A.-C. source, means for applying to one of said elements a field which is dependent on the value of $(x+y)$ and to the other of said elements a field which is dependent on the value of $(x-y)$, and means for deriving from said circuit a voltage proportional to the value of the product of $x$ times $y$, said last-named means including a linear detector coupled to said bridge network output and an integrating network coupled to said linear detector output.

8. In a device for producing a voltage proportional to the value of the product of $x$ and $y$, the combination of a bridge circuit including a pair of elements having a resistance which changes in response to the application of a magnetic field, means to generate pulses having an amplitude dependent on the value of $(x+y)$, means to apply said pulses to one of said pair of elements as a magnetic field proportional thereto, means to generate pulses having an amplitude dependent on the value of $(x-y)$ and means to apply said last named pulses to the other of said elements as a magnetic field proportional thereto, a linear detector coupled to the output of said bridge network to be responsive thereto, an integrating network coupled to said linear detector output, and means to indicate the product of $x$ and $y$ connected to derive an output from said integrating network.

9. The combination recited in claim 8 wherein each of said means to generate pulses includes a pulse generator, a modulating signal generator, and a pulse amplitude modulator responsive to the outputs of said generators.

WILLIAM A. MILLER.

REFERENCES CITED

The following references are of record in the file of this patent:

UNITED STATES PATENTS

| Number | Name | Date |
|---|---|---|
| 1,206,968 | Wilsey | Dec. 5, 1916 |
| 1,810,539 | Sokoloff | June 16, 1931 |
| 2,145,591 | Fitzgerald | Jan. 31, 1939 |
| 2,226,847 | Clark | Dec. 31, 1940 |
| 2,390,051 | Barth | Dec. 4, 1945 |
| 2,412,046 | Hoare | Dec. 3, 1946 |
| 2,443,098 | Dean | June 8, 1948 |

FOREIGN PATENTS

| Number | Country | Date |
|---|---|---|
| 409,318 | Germany | Feb. 4, 1925 |
| 848,330 | France | July 24, 1939 |